US011687155B2

(12) United States Patent
Yasuda et al.

(10) Patent No.: US 11,687,155 B2
(45) Date of Patent: Jun. 27, 2023

(54) METHOD FOR VEHICLE EYE TRACKING SYSTEM (71) Applicant: TOYOTA RESEARCH INSTITUTE, INC., Los Altos, CA (US)

(72) Inventors: Hiroshi Yasuda, San Francisco, CA (US); Manuel Ludwig Kuehner, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 120 days.

(21) Appl. No.: 17/320,146

(22) Filed: May 13, 2021

(65) Prior Publication Data
US 2022/0365593 A1  Nov. 17, 2022

(51) Int. Cl.
*G06F 3/0482* (2013.01)
*G06F 3/0485* (2022.01)
*G06F 3/02* (2006.01)
*G06F 3/01* (2006.01)
*B60K 35/00* (2006.01)
*G06V 20/56* (2022.01)

(52) U.S. Cl.
CPC ............. *G06F 3/013* (2013.01); *B60K 35/00* (2013.01); *G06F 3/02* (2013.01); *G06F 3/0482* (2013.01); *G06F 3/0485* (2013.01); *G06V 20/56* (2022.01); *B60K 2370/126* (2019.05); *B60K 2370/128* (2019.05); *B60K 2370/149* (2019.05); *B60K 2370/152* (2019.05)

(58) Field of Classification Search
CPC ................................ G06F 3/013; G06V 20/56
See application file for complete search history.

(56) References Cited

U.S. PATENT DOCUMENTS

| | | | | |
|---|---|---|---|---|
| 9,377,852 | B1* | 6/2016 | Shapiro | G06F 3/0482 |
| 10,116,873 | B1* | 10/2018 | Campbell | G02B 5/08 |
| 10,349,032 | B2* | 7/2019 | Jemander | G08B 29/188 |
| 10,394,318 | B2* | 8/2019 | Kruglick | G06V 10/50 |
| 10,674,003 | B1* | 6/2020 | Kang | H04M 1/72433 |
| 10,747,007 | B2* | 8/2020 | Tanriover | G06F 3/012 |
| 10,864,853 | B2* | 12/2020 | Kruse | B60Q 9/00 |
| 10,902,273 | B2* | 1/2021 | Upmanue | G06V 20/56 |
| 10,913,428 | B2* | 2/2021 | Dingli | G08B 13/19647 |
| 11,024,160 | B2* | 6/2021 | Ricci | B60W 50/14 |
| 11,040,714 | B2* | 6/2021 | Natroshvili | G06V 10/764 |
| 11,042,994 | B2* | 6/2021 | Stent | G06F 3/012 |
| 11,126,257 | B2* | 9/2021 | Stent | G06F 3/013 |
| 11,144,052 | B2* | 10/2021 | Stent | G06V 40/18 |
| 11,144,754 | B2* | 10/2021 | Hu | G06V 40/193 |
| 11,221,671 | B2* | 1/2022 | Stent | G06F 3/013 |
| 11,254,284 | B2* | 2/2022 | Sung | B60N 2/002 |
| 11,256,104 | B2* | 2/2022 | Tanriover | B60K 35/00 |
| 11,305,776 | B2* | 4/2022 | Beiderbeck | G08G 1/0129 |

(Continued)

*Primary Examiner* — Irfan Habib
(74) *Attorney, Agent, or Firm* — Seyfarth Shaw LLP (57) ABSTRACT

A method for vehicle eye tracking is described. The method includes capturing sensor data based on eye tracking of a vehicle operator. The method also includes identifying sensor data associated with an external environment of a vehicle within the captured sensor data. The method further includes filtering out a sensor data associated with the external environment from the captured sensor data to provide an internal vehicle sensor data. The method also includes controlling a vehicle interface based on the internal vehicle sensor data.

17 Claims, 6 Drawing Sheets

(56) References Cited

U.S. PATENT DOCUMENTS

| | | | |
|---|---|---|---|
| 11,340,701 B2* | 5/2022 | Jiang | G06V 10/82 |
| 11,386,325 B1* | 7/2022 | Srinivasan | G06N 3/045 |
| 11,393,249 B2* | 7/2022 | Lee | G06V 20/597 |
| 11,414,087 B2* | 8/2022 | Ghosh | B60W 50/10 |
| 11,513,593 B2* | 11/2022 | Drozdov | G06F 3/013 |
| 11,562,550 B1* | 1/2023 | Asghar | G06V 20/597 |
| 2015/0199019 A1 | 7/2015 | Steers | |
| 2016/0085301 A1* | 3/2016 | Lopez | H04N 23/611 |
| | | | 345/156 |
| 2018/0011313 A1* | 1/2018 | Nah | G02B 27/01 |
| 2019/0049736 A1* | 2/2019 | Tanriover | G06F 3/012 |
| 2020/0207358 A1* | 7/2020 | Katz | G01C 21/3697 |
| 2022/0050521 A1* | 2/2022 | Drozdov | G06T 7/0012 |
| 2022/0230456 A1* | 7/2022 | Kasarla | G06V 20/593 |
| 2023/0025804 A1* | 1/2023 | Friedland | B60W 40/08 |

* cited by examiner

METHOD FOR VEHICLE EYE TRACKING SYSTEM

BACKGROUND

Field

Certain aspects of the present disclosure generally relate to autonomous vehicle technology and, more particularly, to a vehicle eye tracking system.

Background

Autonomous agents (e.g., vehicles, robots, etc.) rely on machine vision for sensing a surrounding environment by analyzing areas of interest in a scene from images of the surrounding environment. Autonomous agents, such as driverless cars and robots, are quickly evolving and have become a reality in this decade. The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number.

These different levels of autonomous vehicles may provide a safety system that improves driving of a vehicle. For example, in a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle. The set of ADAS features installed in the autonomous vehicle may be a lane centering assistance system, a lane departure warning system, and/or a brake assistance system.

Interaction with the set of ADAS features available from a vehicle generally involves a human-machine-interface (HMI). The HMI of a vehicle may fuse sensor data. Unfortunately, the sensor data captured in these vehicle HMI systems can be noisy. In particular, these vehicle HMI systems may have difficulty removing irrelevant noise from raw data for tracking.

SUMMARY

A method for vehicle eye tracking is described. The method includes capturing sensor data based on eye tracking of a vehicle operator. The method also includes identifying sensor data associated with an external environment of a vehicle within the captured sensor data. The method further includes filtering out a sensor data associated with the external environment from the captured sensor data to provide an internal vehicle sensor data. The method also includes controlling a vehicle interface based on the internal vehicle sensor data.

A non-transitory computer-readable medium having program code recorded thereon for vehicle eye tracking is described. The program code is executed by a processor. The non-transitory computer-readable medium includes program code to capture sensor data based on eye tracking of a vehicle operator. The non-transitory computer-readable medium also includes program code to identify the sensor data associated with an external environment of the vehicle within the captured sensor data. The non-transitory computer-readable medium further includes program code to filter out the sensor data associated with the external environment from the captured sensor data to provide an internal vehicle sensor data. The non-transitory computer-readable medium also includes program code to control a vehicle interface based on the internal vehicle sensor data.

A system for vehicle eye tracking is described. The system includes a vehicle perception module to capture sensor data based on eye tracking of a vehicle operator. The system also includes an external environment detection module to identify the sensor data associated with an external environment of the vehicle within the captured sensor data. The system further includes an external sensor data filtering module to filter out the sensor data associated with the external environment from the captured sensor data to provide an internal vehicle sensor data. The system also includes a vehicle interface control module to control a vehicle interface based on the internal vehicle sensor data.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

The National Highway Traffic Safety Administration ("NHTSA") has defined different "levels" of autonomous vehicles (e.g., Level 0, Level 1, Level 2, Level 3, Level 4, and Level 5). These different levels of autonomous vehicles may provide a safety system that improves driving of a vehicle. For example, in a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle. The set of ADAS features installed in the autonomous vehicle may be a lane centering assistance system, a lane departure warning system, and/or a brake assistance system.

Interaction with the set of ADAS features available from a vehicle generally involves a human-machine-interface (HMI). The HMI of a vehicle may fuse sensor data captured by a vehicle using a sensor fusion process. This sensor fusion process may involve merging data from several different sensors to collectively perform a function that a single sensor is unable to provide. Unfortunately, the fused sensor data captured in these vehicle HMI systems can be noisy. In particular, these vehicle HMI systems may have difficulty removing irrelevant noise from raw data for tracking an operator of the vehicle, such as tracking the eyes of the operator. Conventional eye tracking systems have difficulty removing irrelevant noise from the raw sensor data for performing eye tracking.

In aspects of the present disclosure, a vehicle eye tracking system improves eye tracking by using existing sensors to incorporate data from an environment external to the vehicle. Unlike conventional systems, the sensor data from the external environment is correlated with internal vehicle data associated with eye tracking to determine a real intent of the vehicle operator. In some aspects, the vehicle eye tracking system removes noise from raw sensor data to provide more robust eye tracking by incorporating information associated with external events outside of the vehicle. For example, the vehicle eye tracking system measures the direction of the gaze of the vehicle operator relative to the vehicle cabin. In this example, the vehicle eye tracking system uses existing sensors that monitor the environment outside of a vehicle with internal data for eye tracking. These existing sensors for safety features such as lane keeping assist (LKA), brake assist, advanced driver assistance systems (ADAS), and the like, may be adapted to improve eye tracking of the vehicle operator.

Aspects of the present disclosure are directed to a vehicle eye tracking system that distinguishes noise in raw data from eye tracking to improve a human-machine-interface (HMI) of a vehicle by correlating internal vehicle data and external vehicle data. These aspects of the present disclosure describe a system and method that improve a user's interaction with a vehicle interface. The method includes controlling a vehicle interface based on eye tracking. This method includes capturing sensor data based on eye tracking of a vehicle operator. The method also includes identifying sensor data associated with an external vehicle environment within the captured sensor data. The method also further includes filtering out the sensor data associated with the external vehicle environment to provide internal vehicle sensor data. The method also includes controlling the vehicle interface based on the internal vehicle sensor data.

Figure 1:
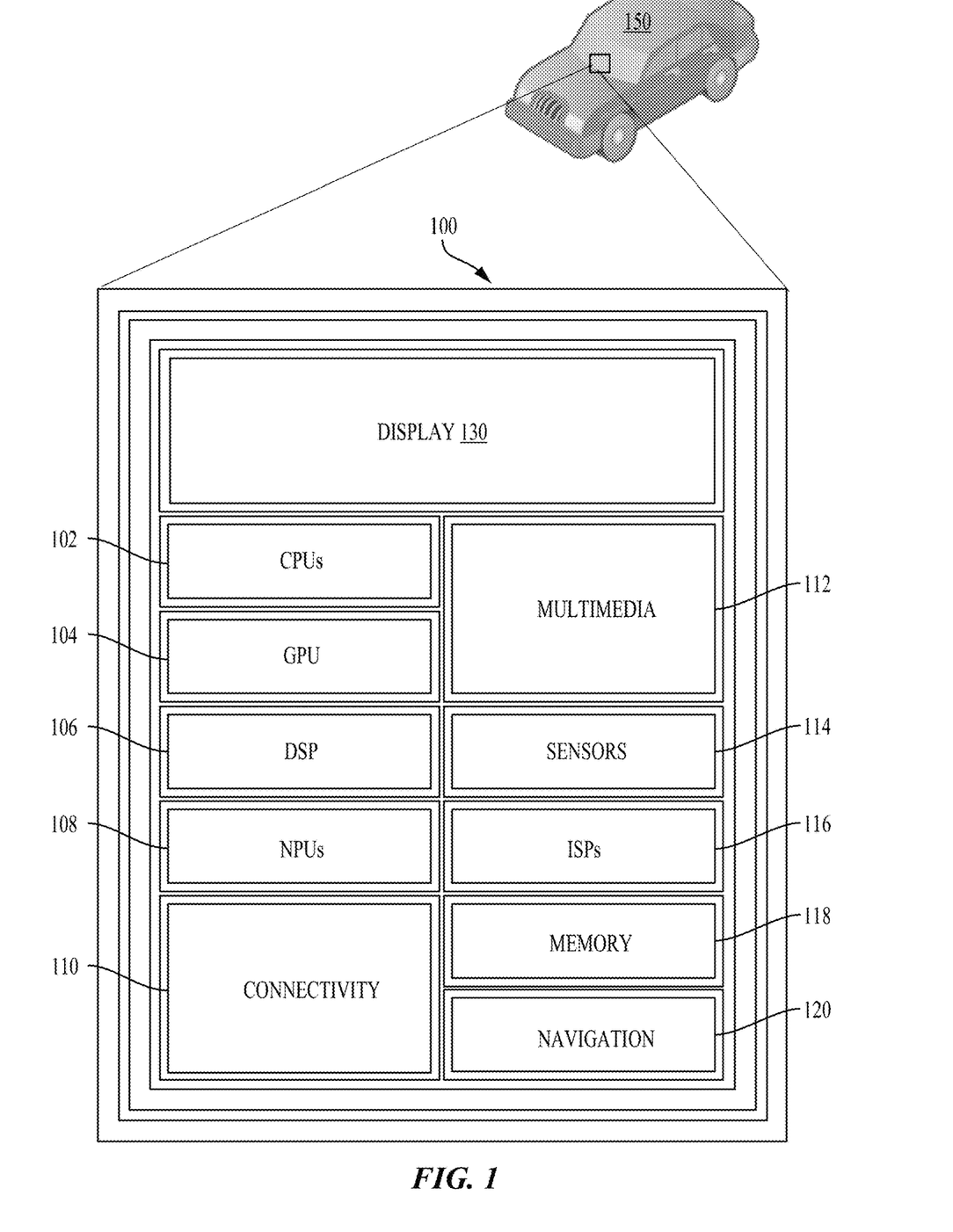
FIG. 1 illustrates an example implementation of designing a neural network using a system-on-a-chip (SOC) for a vehicle eye tracking system, in accordance with aspects of the present disclosure.

FIG. 1 illustrates an example implementation of the aforementioned system and method for a vehicle eye tracking system using a system-on-a-chip (SOC) 100 of a vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle safety action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the vehicle 150. In this arrangement, the vehicle 150 may include a processor and other features of the SOC 100. In this aspect of the present disclosure, instructions loaded into a processor (e.g., CPU 102) or the NPU 108 of the vehicle 150 may include program code to determine one or more merge gaps between vehicles in a target lane of a multilane highway based on images processed by the sensor processor 114. The instructions loaded into a processor (e.g., CPU 102) may also include program code to compute an exposure time in which the ego vehicle is specified to merge into the one or merge gaps, and program code to select a merge gap between a first vehicle and a second vehicle in the target lane of the multilane highway having a maximum exposure time.

Figure 2:
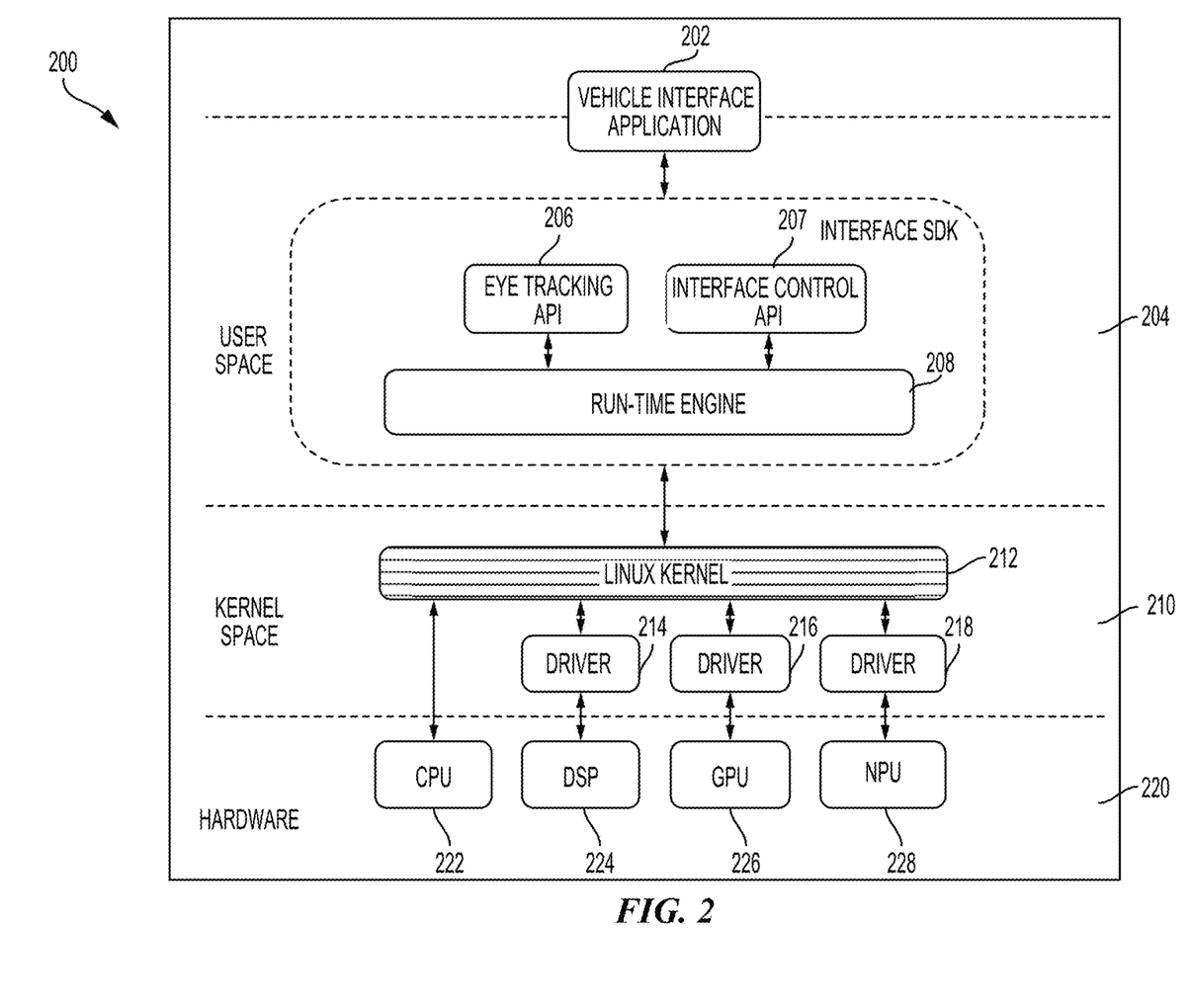
FIG. 2 is a block diagram illustrating a software architecture that may modularize artificial intelligence (AI) functions for a vehicle eye tracking system of an autonomous agent, according to aspects of the present disclosure.

FIG. 2 is a block diagram illustrating a software architecture 200 that may modularize artificial intelligence (AI) functions for a vehicle eye tracking system, according to aspects of the present disclosure. Using the architecture, a vehicle interface application 202 may be designed such that it may cause various processing blocks of a system-on-a-chip (SOC) 220 (for example a CPU 222, a DSP 224, a GPU 226, and/or an NPU 228) to perform supporting computations during run-time operation of the vehicle interface application 202. While FIG. 2 describes the software architecture 200 for operating a vehicle interface system, it should be recognized that vehicle interface system functionality is not limited to autonomous agents. According to aspects of the present disclosure, a vehicle interface system is applicable to any vehicle type, provided the vehicle is equipped with appropriate functions of an advanced driver assistance system (ADAS).

The vehicle interface application 202 may be configured to call functions defined in a user space 204 that may, for example, provide for vehicle interface services. The vehicle interface application 202 may make a request to compile program code associated with a library defined in an eye tracking application programming interface (API) 206 to help determine a real intent of a vehicle operator. The vehicle interface application 202 may also make a request to compile program code associated with a library defined in an interface control API 207 to improve a human-machine-interface (HMI).

A run-time engine 208, which may be compiled code of a runtime framework, may be further accessible to the vehicle interface application 202. The vehicle interface application 202 may cause the run-time engine 208, for example, to take actions for communicating with a vehicle driver. When the vehicle operator begins to interact with a vehicle interface, the run-time engine 208 may in turn send a signal to an operating system 210, such as a Linux Kernel 212, running on the SOC 220. FIG. 2 illustrates the Linux Kernel 212 as software architecture for implementing vehicle eye tracking features of the vehicle. It should be recognized, however, aspects of the present disclosure are not limited to this exemplary software architecture. For example, other kernels may be used to provide the software architecture to support vehicle operator eye tracking functionality to provide improved vehicle interface control.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
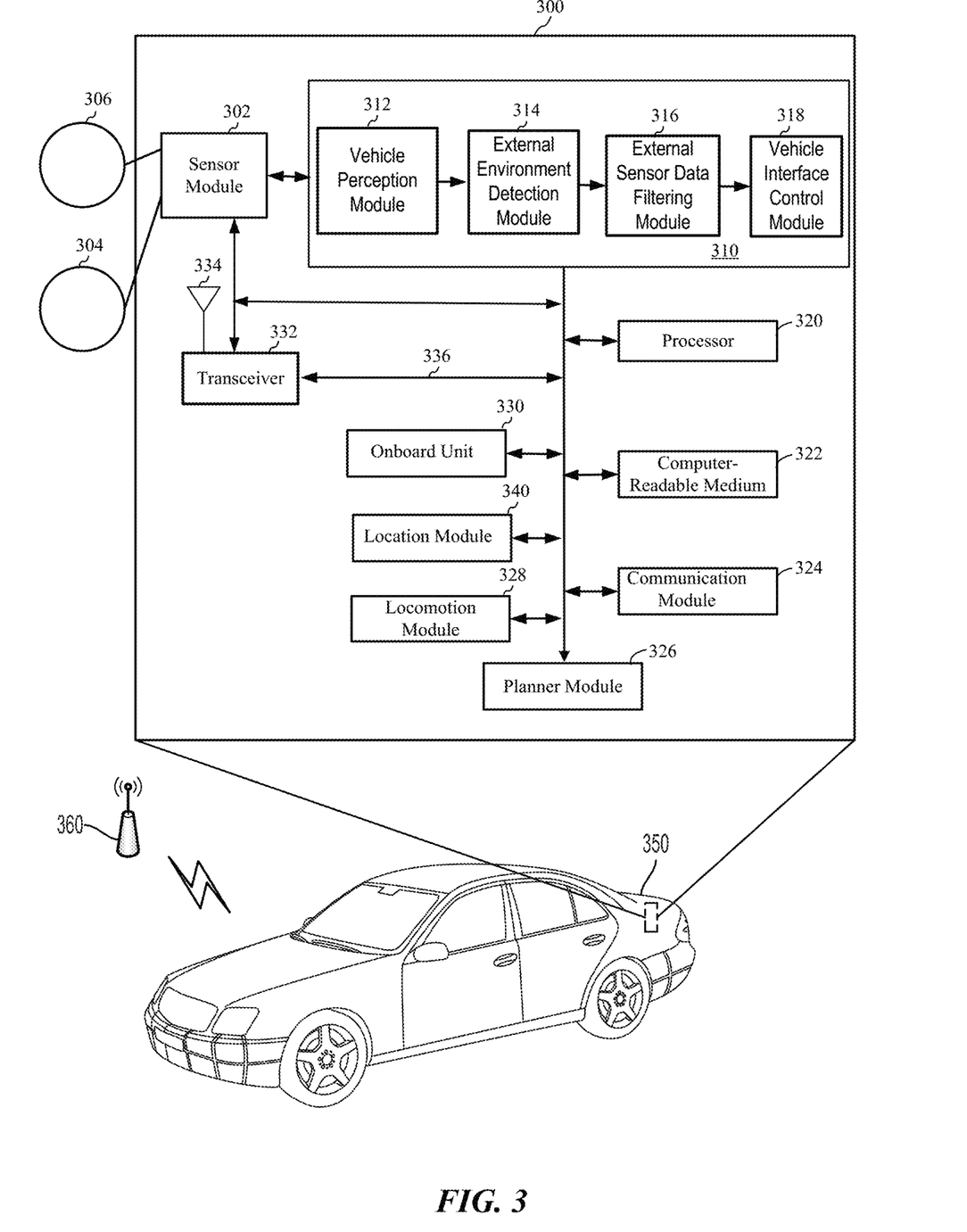
FIG. 3 is a diagram illustrating an example of a hardware implementation for a vehicle eye tracking system, according to aspects of the present disclosure.

FIG. 3 is a diagram illustrating an example of a hardware implementation for a vehicle eye tracking system 300, according to aspects of the present disclosure. The vehicle eye tracking system 300 may be configured for improved human-machine-interface (HMI) control of a car 350. The vehicle eye tracking system 300 may be a component of a vehicle, a robotic device, or other non-autonomous device (e.g., non-autonomous vehicles). For example, as shown in FIG. 3, the vehicle eye tracking system 300 is a component of a car 350.

Aspects of the present disclosure are not limited to the vehicle eye tracking system 300 being a component of the car 350. Other devices, such as a bus, motorcycle, or other like non-autonomous vehicle, are also contemplated for implementing the vehicle eye tracking system 300. In this example, the car 350 may be autonomous or semi-autonomous; however, other configurations for the car 350 are contemplated, such as an advanced driver assistance system (ADAS).

The vehicle eye tracking system 300 may be implemented with an interconnected architecture, represented generally by an interconnect 336. The interconnect 336 may include any number of point-to-point interconnects, buses, and/or bridges depending on the specific application of the vehicle eye tracking system 300 and the overall design constraints. The interconnect 336 links together various circuits including one or more processors and/or hardware modules, represented by a sensor module 302, a vehicle interface controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle eye tracking system 300 includes a transceiver 332 coupled to the sensor module 302, the vehicle interface controller 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle interface controller 310 to/from connected vehicles within the vicinity of the car 350.

The vehicle eye tracking system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle eye tracking system 300 to perform the various functions described for vehicle human-machine-interface (HMI) control of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images of the vehicle operator. The second sensor 304 may be a ranging sensor, such as a light detection and ranging (LiDAR) sensor or a radio detection and ranging (RADAR) sensor for capturing an external vehicle environment. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle interface controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle eye tracking system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle eye tracking system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but is still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle interface controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the vehicle interface controller 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle interface controller 310 may receive sensor data directly from the first sensor 306 and the second sensor 304 to determine, for example, input traffic data images.

Interaction with the set of ADAS features available from the car 350 generally involves a human-machine-interface (HMI). The HMI of the car 350 may fuse sensor data captured by the first sensor 306 and the second sensor 304 using a sensor fusion process. This sensor fusion process may involve merging data from the first sensor 306 and/or the second sensor 304 to collectively perform a function that a single sensor is unable to provide. Unfortunately, the fused sensor data captured by the first sensor 306 and/or the second sensor 304 can be noisy. In particular, a vehicle HMI system of the car may have difficulty removing irrelevant noise from raw data for tracking an operator of the car 350, such as tracking the eyes of the operator. Conventional eye tracking systems have difficulty removing irrelevant noise from the raw sensor data for performing eye tracking.

In aspects of the present disclosure, the vehicle eye tracking system 300 improves eye tracking by using the first sensor 306 and/or the second sensor 304 to incorporate data from an environment external to the car 350. Unlike conventional systems, the sensor data from the external environment is correlated with internal vehicle data associated with eye tracking to determine a real intent of the vehicle operator. In some aspects of the present disclosure, the vehicle eye tracking system 300 removes noise from raw sensor data to provide more robust eye tracking by incorporating information associated with external events outside of the car 350. For example, the vehicle eye tracking system 300 measures the direction of the gaze of the vehicle operator relative to the vehicle cabin. In this example, the vehicle eye tracking system uses existing sensors (e.g., the first sensor 306 and the second sensor 304) that monitor the environment outside of the car 350 with internal data for eye tracking, such as a driver tracking system. These existing sensors for safety features such as lane keeping assist (LKA), brake assist, advanced driver assistance systems (ADAS), and the like, may be adapted to improve eye tracking of the vehicle operator.

In these aspects of the present disclosure, the vehicle eye tracking system 300 distinguishes noise in raw data from eye tracking to improve a human-machine-interface (HMI) of the car 350 by correlating internal vehicle data and external vehicle data. As shown in FIG. 3, the vehicle includes a vehicle interface controller 310 that includes a vehicle perception module 312, an external environment detection module 314, an external sensor data filtering module 316, and a vehicle interface control module 318. The vehicle perception module 312, the external environment detection module 314, the external sensor data filtering module 316, and the vehicle interface control module 318 may be components of a same or different artificial neural network, such as a deep convolutional neural network (CNN). The vehicle interface controller 310 is not limited to a CNN.

The vehicle perception module 312 receives a data stream from the first sensor 306 and/or the second sensor 304. The data stream may include a 2D RGB image from the first sensor 306 and LIDAR data points from the second sensor 304. The data stream may include multiple frames, such as image frames of traffic data. These sensors may also include a driver facing camera to monitor the operator of the car 350. The vehicle interface controller 310 is configured to control a vehicle interface based on eye tracking of the vehicle operator.

In these aspects of the present disclosure, the vehicle perception module 312 captures sensor data based on eye tracking of the vehicle operator. The external environment detection module 314 may be configured to identify sensor data associated with an external vehicle environment within the captured sensor data from the vehicle perception module 312. In addition, the external sensor data filtering module 316 is configured to filter out the sensor data associated with the external vehicle environment to provide internal vehicle sensor data. In these aspects of the present disclosure, the vehicle interface control module 318 is configured to control the vehicle interface based on the internal vehicle sensor data.

Figure 4:
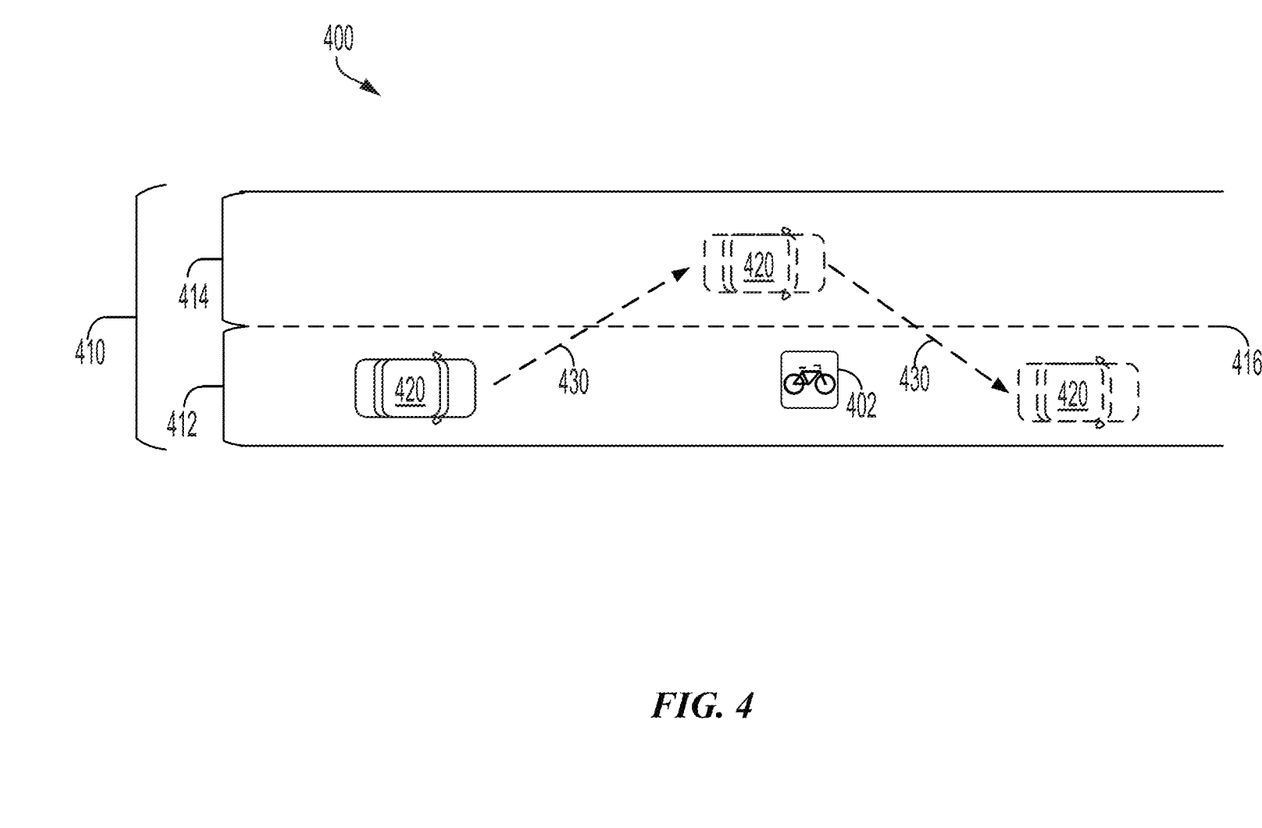
FIG. 4 is a diagram illustrating an overview of a roadway environment, including a vehicle in a first lane of a roadway including a cycle, according to aspects of the present disclosure.

FIG. 4 is a diagram illustrating an overview of a roadway environment, including a vehicle in a first lane of a roadway including a cycle, according to aspects of the present disclosure. In this example, a roadway environment 400 includes a roadway 410, having a first lane 412 and a second lane 414, in which a cycle 402 is in the first lane 412. A vehicle 420 is traveling in the first lane 412 and the second lane 414 is empty. In this example, the vehicle 420 crosses a dashed center line 416 to change lanes from the first lane 412 to the second lane 414 and back to the first lane 412 to avoid the cycle 402, as shown by a trajectory 430. In this example, the vehicle 420 is configured to track the eyes of the operator of the vehicle 420. In this example, the vehicle 420, may be the car 350, shown in FIG. 3.

In aspects of the present disclosure, eye tracking of the vehicle operator is configured to distinguish whether the vehicle operator's gaze is fixed on an external vehicle environment (e.g., the cycle 402) or an internal vehicle environment (e.g., a heads-up display). In these aspects of the present disclosure, the vehicle eye tracking system cleans or removes data related to unintentional eye movement. Removal of the unintentional eye movement enables a currently selected function to remain active in response to a mechanical button of a heads-up display. In this way, the vehicle eye tracking system maintains a real intent of the vehicle operator. Removal of the unintentional eye movement of the vehicle operator may be performed, for example, as shown in FIGS. 5A-5B.

Figure 5A:
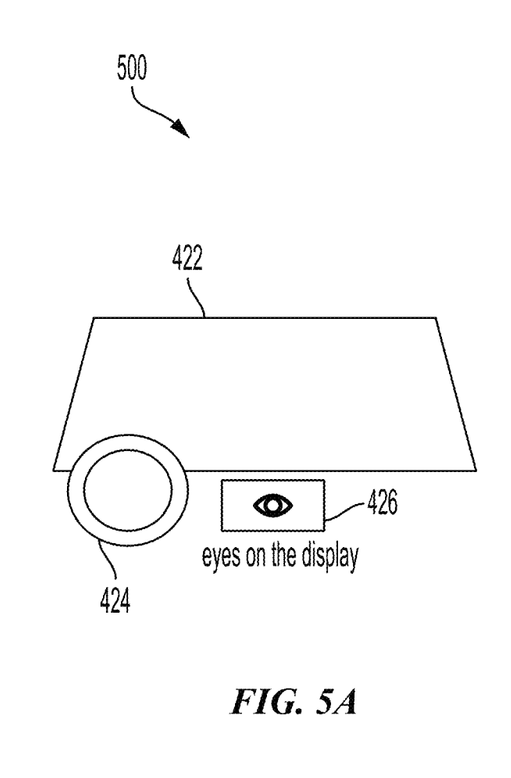
FIGS. 5A-5B are block diagrams illustrating removal of unintentional eye movement to maintain a currently selected function in response to a mechanical button of a heads-up display, according to aspects of the present disclosure.
Figure 5B:
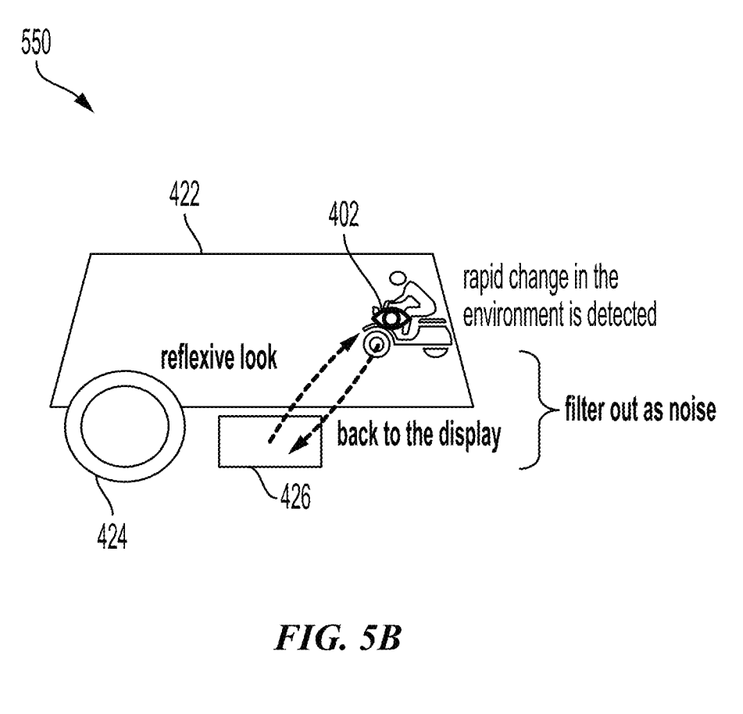

FIGS. 5A-5B are block diagrams illustrating removal of unintentional eye movement to maintain a currently selected function in response to a mechanical button of a heads-up display, according to aspects of the present disclosure. FIG. 5A illustrates a cabin of the vehicle 420 of FIG. 4 at a first instance in time 500. The vehicle cabin includes a front windshield 422, a steering wheel 424 and a vehicle display 426. For example, the vehicle display 426 may be a heads-up display (HUD). In this example, a gaze of the vehicle operator is fixed on the vehicle display 426. An intent of the vehicle operator may be an available function from the vehicle display 426.

According to aspects of the present disclosure, a vehicle eye tracking system may detect a direction of gaze for the vehicle operator in the vehicle cabin using eye tracking. For example, the vehicle operator may use a mechanical button, such as a thumbwheel, to operate a function currently selected on the vehicle display 426. The vehicle eye tracking system uses eye tracking to control the function of the selected mechanical button for the vehicle operator. For example, the vehicle operator scrolls through a list on a screen by rotating the mechanical button. In this example, the vehicle eye tracking system identifies which list the vehicle operator desires to control by using eye tracking.

FIG. 5B illustrates the cabin of the vehicle 420 of FIG. 4 at a second instance in time 550. In this example, an external event subsequently occurs, such as the cycle in the first lane 412 of the roadway 410 of FIG. 4. The cycle 402 may cross the roadway 410 and enter a peripheral area of the vehicle operator's eyes. In this example, the vehicle operator looks away from the vehicle display 426 for a short period in the direction of the cycle 402, which is referred to as a reflexive gaze. In this aspect of the present disclosure, the vehicle eye tracking system recognizes this external event as noise and removes the data associated with the event from the eye tracking data. In this aspect of the present disclosure, the vehicle eye tracking system uses data about the environment from existing sensors to correlate, based on the time and the direction, with the eye tracking data internal to the vehicle. Eliminating this external event as noise helps keep the list selected by the vehicle operator in focus when the vehicle operator unintentionally alters a gaze from the vehicle display 426.

Aspects of the present disclosure are directed to a vehicle eye tracking system that distinguishes noise in raw data associated with eye tracking to improve a human-machine-interface (HMI) of a vehicle by correlating internal data and external data of a vehicle environment. Accordingly, the vehicle eye tracking system determines noise in the eye tracking data using the data about external events detected within an external vehicle environment. In these aspects of the present disclosure, the vehicle eye tracking system cleans or removes data related to unintentional eye movement. Removal of the unintentional eye movement enables a currently selected function active in response to a mechanical button of a heads-up display. In this way, the vehicle eye tracking system maintains a real intent of the vehicle operator. A method for a vehicle eye tracking system is shown in FIG. 6.

Figure 6:
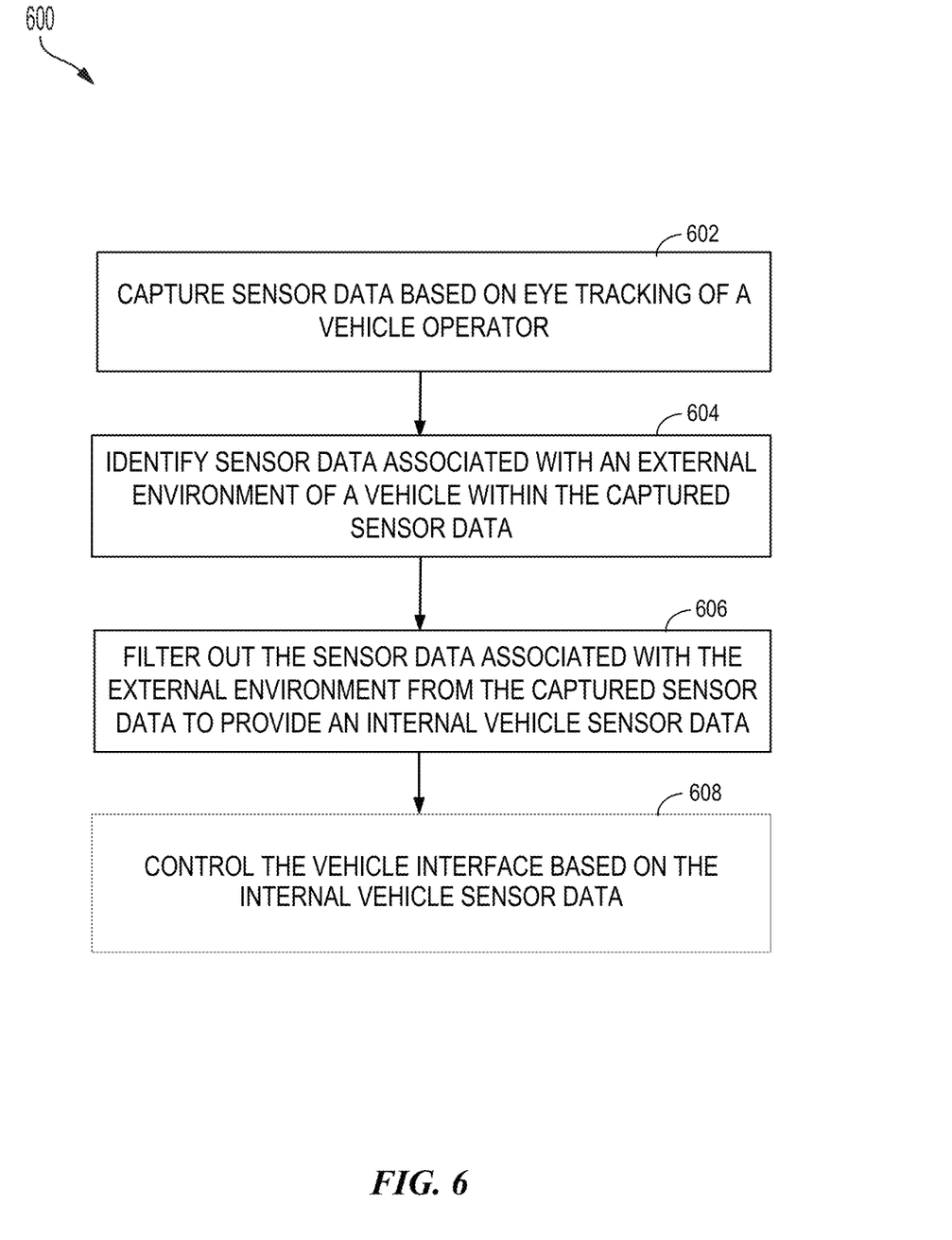
FIG. 6 is a flowchart illustrating a method for a vehicle eye tracking system, according to aspects of the present disclosure.

FIG. 6 is a flowchart illustrating a method for a vehicle eye tracking system, according to aspects of the present disclosure. A method 600 begins at block 602, in which sensor data is capture based on eye tracking of a vehicle operator. For example, as shown in FIG. 5A, a gaze of the vehicle operator is fixed on the vehicle display 426. An intent of the vehicle operator may be an available function from the vehicle display 426. A vehicle eye tracking system may detect a direction of gaze for the vehicle operator in the vehicle cabin using eye tracking. For example, the vehicle operator may use a mechanical button, such as a thumbwheel, to operate a function currently selected on the vehicle display 426.

At block 604, sensor data associated with an external environment of a vehicle is identified within the captured sensor data. For example, FIG. 5B illustrates the cabin of the vehicle 420 of FIG. 4 at a second instance in time 550. In this example, an external event subsequently occurs, such as the cycle in the first lane 412 of the roadway 410 of FIG. 4. The cycle 402 may cross the roadway 410 and enter a peripheral area of the vehicle operator's eyes. In this example, the vehicle operator looks away from the vehicle display 426 for a short period in the direction of the cycle 402. In this aspect of the present disclosure, the vehicle eye tracking system recognizes this external event as noise, which is referred to as external vehicle sensor data.

At block 606, the sensor data associated with the external environment is filtered out from the captured sensor data to provide an internal vehicle sensor data. For example, as shown in FIG. 5B, the vehicle operator looks away from the vehicle display 426 for a short period in the direction of the cycle 402. In this aspect of the present disclosure, the vehicle eye tracking system recognizes this external event as noise and removes the data associated with the event from the eye tracking data. In this aspect of the present disclosure, the vehicle eye tracking system uses data about the environment from existing sensors to correlate, based on the time and the direction, with the eye tracking data internal to the vehicle.

At block 608, the vehicle interface is controlled based on the internal vehicle sensor data. For example, as shown in FIG. 5B, the vehicle eye tracking system determines noise in the eye tracking data using the data about external events detected within an external vehicle environment. In these aspects of the present disclosure, the vehicle eye tracking system cleans or removes data related to unintentional eye movement. Removal of the unintentional eye movement enables a currently selected function active in response to a mechanical button of a heads-up display. In this way, the vehicle eye tracking system maintains a real intent of the vehicle operator.

In some aspects, the method shown in FIG. 6 may be performed by the SOC 100 (FIG. 1) or the software architecture 200 (FIG. 2) of the vehicle 150. That is, each of the elements or methods may, for example, but without limitation, be performed by the SOC 100, the software architecture 200, the processor (e.g., CPU 102) and/or other components included therein of the vehicle 150, or the vehicle eye tracking system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for vehicle eye tracking, the method comprising:
    capturing sensor data based on eye tracking of a vehicle operator;
    identifying sensor data associated with an external environment of a vehicle within the captured sensor data;
    filtering out a sensor data associated with the external environment from the captured sensor data to provide an internal vehicle sensor data; and
    controlling a vehicle interface based on a gaze direction of the vehicle operator directed to the vehicle interface according to the internal vehicle sensor data controlling a currently selected function associated with a selected mechanical button on a vehicle display for the vehicle operator in response to internal vehicle sensor data.

2. The method of claim 1, in which filtering comprises:
    determining an external vehicle sensor data associated with a reflexive gaze of the vehicle operator on the external environment; and
    removing the external sensor data from the captured sensor data to provide the internal vehicle sensor data.

3. The method of claim 1, in which controlling comprises maintaining the currently selected function to remain active in response to the internal vehicle sensor data.

4. The method of claim 1, in which controlling comprises:
    identifying a list a vehicle operator desires to control according to the internal vehicle sensor data; and
    scrolling through the list on a vehicle display in response to rotating and/or pressing of a mechanical button.

5. The method of claim 1, in which controlling comprises scrolling through a selected list on a vehicle display according to the internal vehicle sensor data.

6. The method of claim 1, further comprising determining an intent of the vehicle operator according to the internal vehicle sensor data.

7. The method of claim 1, in which identifying the sensor data associated with the external environment of the vehicle comprises identifying a reflexive gaze of the vehicle operator away from a vehicle display.

8. A non-transitory computer-readable medium having program code recorded thereon for vehicle eye tracking, the program code being executed by a processor and comprising:
    program code to capture sensor data based on eye tracking of a vehicle operator;
    program code to identify the sensor data associated with an external environment of the vehicle within the captured sensor data;
    program code to filter out the sensor data associated with the external environment from the captured sensor data to provide an internal vehicle sensor data; and program code to control a vehicle interface based on a gaze direction of the vehicle operator directed to the vehicle interface according to the internal vehicle sensor data further comprising program code to control a currently selected function associated with a selected mechanical button on a vehicle display for the vehicle operator in response to internal vehicle sensor data.

9. The non-transitory computer-readable medium of claim 8, in which the program code to filter comprises:
   program code to determine an external vehicle sensor data associated with a reflexive gaze of the vehicle operator on the external environment; and
   program code to remove the external sensor data from the captured sensor data to provide the internal vehicle sensor data.

10. The non-transitory computer-readable medium of claim 9, in which the program code to control comprises program code to maintain the currently selected function to remain active in response to the internal vehicle sensor data.

11. The non-transitory computer-readable medium of claim 8, in which the program code to control comprises:
   program code to identify a list a vehicle operator desires to control according to the internal vehicle sensor data; and
   program code to scroll through the list on a vehicle display in response to rotating and/or pressing of a mechanical button.

12. The non-transitory computer-readable medium of claim 11, in which the program code to control comprises program code to scroll through a selected list on the vehicle display according to the internal vehicle sensor data.

13. The non-transitory computer-readable medium of claim 8, further comprising program code to determine an intent of the vehicle operator according to the internal vehicle sensor data.

14. The non-transitory computer-readable medium of claim 8, in which the program code to identify the sensor data associated with the external environment of the vehicle comprises program code to identify a reflexive gaze of the vehicle operator away from a vehicle display.

15. A system for vehicle eye tracking, the system comprising:
   a vehicle perception module to capture sensor data based on eye tracking of a vehicle operator;
   an external environment detection module to identify the sensor data associated with an external environment of the vehicle within the captured sensor data;
   an external sensor data filtering module to filter out the sensor data associated with the external environment from the captured sensor data to provide an internal vehicle sensor data; and
   a vehicle interface control module to control a vehicle interface based on a gaze direction of the vehicle operator directed to the vehicle interface according to the internal vehicle sensor data in which the vehicle interface control module is further to control a currently selected function associated with a selected mechanical button on a vehicle display for the vehicle operator in response to the internal vehicle sensor data.

16. The system of claim 15, in which the external sensor data filtering module is further to determine an intent of the vehicle operator according to the internal vehicle sensor data.

17. The system of claim 15, in which the vehicle interface control module is further to maintain a currently selected function to remain active in response to the internal vehicle sensor data.

* * * * *